Jan. 20, 1959     H. BURTON     2,869,879
COLLET-FIXTURE ASSEMBLY WITH ECCENTRIC ADJUSTMENT
Filed Jan. 28, 1957

*INVENTOR.*
HOWARD BURTON
BY *Whittemore, Hulbert &*
*Belknap*
ATTORNEYS

United States Patent Office 2,869,879
Patented Jan. 20, 1959

2,869,879

COLLET-FIXTURE ASSEMBLY WITH ECCENTRIC ADJUSTMENT

Howard Burton, Northville, Mich., assignor to Air-Matic Products Company, Inc., Southfield Township, Mich., a corporation of Michigan Application January 28, 1957, Serial No. 636,526

5 Claims. (Cl. 279—6)

The present invention relates to an improved collet-fixture assembly, in the form of an adjustable chuck or like unit adapted to support a tool or a work piece for a rotative machining operation, or related type of operation.

It is a general object of the invention to provide a tool or work holding fixture of this sort which is capable of a compound adjustment in order to compensate for an eccentricity of a work piece or tool in reference to the rotative axis of the fixture assembly itself, or a supporting spindle, in the event such assembly is rotated for coaction with a tool or work piece, or vice versa; or, if desired, to produce such a relative eccentricity.

It is a more specific object of the invention to provide a holding unit, equally suitable for the clamping of a tool or work piece as stated (such tool or work piece being hereinafter referred to for simplicity as the clamped member), which comprises a body, a member coacting with this body to actuate the same radially to and from a clamping engagement with the clamped member, and a pair of associated eccentric collets or sleeve members, one of which is an adjusting collet or sleeve member having a bore rotatably and eccentrically positionable in the body. The other is a clamping collet or sleeve member rotatably positionable in the eccentric bore of the adjusting sleeve and having its own eccentric bore to receive a clamped member. These sleeves are individually rotatable 360° in relation to one another and in relation to the body to effect any desired lateral adjustment, within substantial limits. This is true whether it is an adjustment of the rotative axis of a clamped member, as in a rotative chuck or collet structure, relative to the axis of the chuck body or relative to the axis of a tool or worked member rotated in reference to the body, as in a fixture.

Another and more specific object is to provide an assembly of this sort in which the eccentric clamping and adjusting sleeves have circumferential sliding engagement on non-coaxial circular surfaces during the rotative adjustment, the adjusting sleeve and body being slidably engageable on coaxial surfaces.

A more specific object is to provide a holding assembly as described, in which the body and sleeve subassembly is split to permit radial clamping and unclamping movement, and in which the sleeves have novel mating engagement to act as a unit in adjusted position.

Generally, it is an object to provide a tool or work clamping assembly or unit as described, in which a primary rotative adjustment of an eccentric adjusting member, preferably an eccentric collet or sleeve directly rotatable within the clamping bore of the body of the assembly, is effective to make an initial rough adjustment of the work piece as described, and in which a further rotative adjustment of an eccentric work holding or clamping member, preferably a further rotative eccentric sleeve or collet within the eccentric bore of the adjusting member as herein shown, is effective to make the desired final adjustment of the clamped member. These adjustments may be made in any direction of relative rotation of the adjusting and holding or clamping members relative to one another, and/or to the body of the assembly.

A further object of the invention is to provide a collet-fixture assembly as described, which is of extremely simple and inexpensive construction, yet which enables extremely precise and accurate adjustments of the clamped member to be accomplished with ease and speed.

Other objects and features of the invention will become apparent as the description proceeds, especially when taken in conjunction with the accompanying drawings, wherein.

The invention is herein illustrated and described as embodied in a tubular, chuck-like tool or work holding fixture, although the advantages of the improvement in this particular type of holder construction may suggest its ready applicability to other types. As thus shown, the unit or assembly is generally designated 10. It will be assumed for the purposes of this description that the assembly comprises a tubular cylindrical body 11 adapted to be secured to a rotative driver of any machine tool or equipment, such as a drill press, lathe, or milling machine arbor and that, as indicated above, the driver is operated to rotate a tool, work piece or like clamped member held by the assembly. However, it is also evident that the body 11 may be a fixed one, relative to which a tool or work piece is rotated generally coaxially. In either instance, the improved compound eccentric adjusting provisions of the invention enable the clamped member, or any local part thereof, to be adjusted as to concentricity or eccentricity in relation to the axis of rotation of the body 11 and/or its driver, thus effecting a desired adjustment of the axis of the clamped member in relation to a coacting instrumentality, whether it be a tool, work holder or the like, rotatable or stationary in nature.

Figure 2:
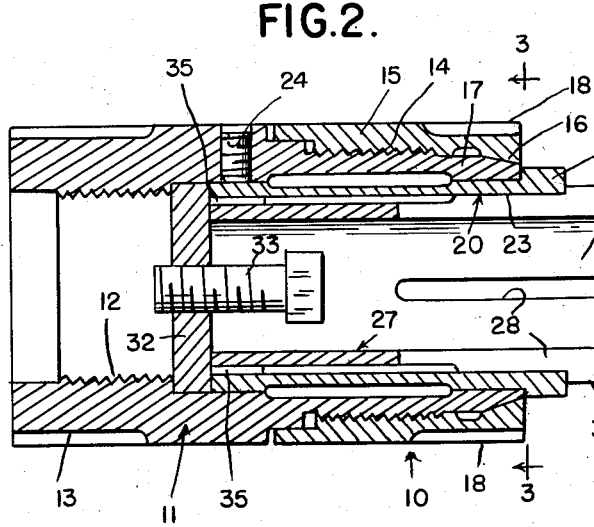
Fig. 2 is a view in vertical axial section of the unit of Fig. 1 along line 2—2 of Fig. 1.

The body 11 is internally threaded at 12 adjacent its rear or lefthand end, as viewed in Fig. 2, to receive the coacting driver or support (not shown), and is slotted at 13 to receive a spanner or like tool for the purpose of making such connection. Adjacent its opposite, forward or nose end the body 11 is externally threaded at 14 for the reception of a tubular clamp nut 15, and the nut and body have coacting conical nose surfaces engageable at 16 to effect radial contraction of the body 11 at its nose. In order to permit this radial movement the nose of the body 11 is appropriately slotted at 11' to provide flexible arcuate nose segments 17. The forward end of the nut 15 is milled at 18 to afford external longitudinal slots accommodating a tool in making its threaded adjustment on body 11.

Figure 1:
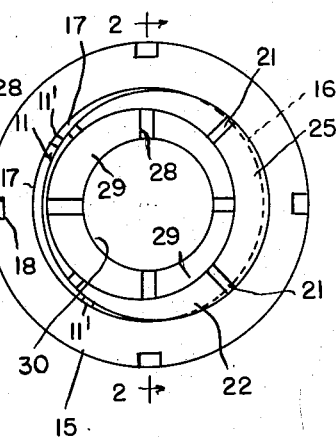
Fig. 1 is an end view of the improved assembly incorporating the principle of the invention in the form of a chuck, as viewed from the outer tool or work receiving end thereof.
Figure 3:
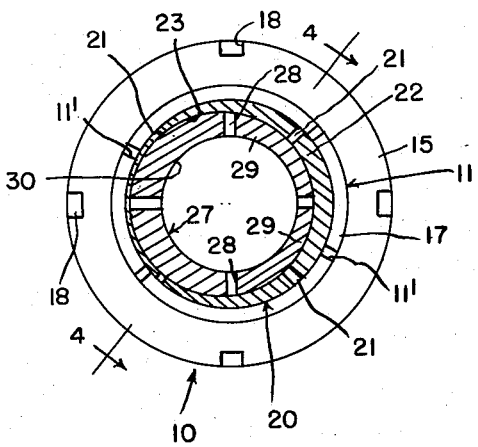
Fig. 3 is a view in transverse vertical section along line 3—3 of Fig. 2.

The reference numeral 20 generally designates an eccentric outer adjusting collet or sleeve of elongated tubular outline which, as indicated in Figs. 1 and 3, is slotted longitudinally at 21 adjacent its forward nose portion to afford radially flexible segments 22. The outer periphery of the adjusting sleeve 20 is concentrically received in the bore of the clamp body 11, and the relatively eccentric inner bore of this sleeve is designated 23.

The adjusting sleeve 20 is held in its adjusted position within the body 11 by means of a set screw 24 threaded into the body. At its forward end the member 21 has an integral flange 25 which abuts rearwardly against the nose segments 17 of body 11.

The reference numeral 27 generally designates an eccentric inner clamping sleeve which has a forward nose portion longitudinally slotted at 28 to afford radially flexible clamping segments 29 similar to the segments 22, 17 of the adjusting member 20 and the body 11. These are received for rotation in the nose portion of the outer adjusting sleeve or member 20, and the internal bore of the sleeve 27, which receives and clamps a tool, work piece or like clamped member, is designated by the reference numeral 30.

The clamping sleeve 27 is provided with an internal flange 31 at its forward end, which abuts rearwardly against the flange 25 of the adjusting sleeve 20.

Both of the sleeves 20, 27 abut rearwardly against a rigid seating disk 32 disposed within the bore of body 11, which disk adjustably carries a forwardly facing abutment screw 33, which determines the limit of axial insertion of the clamped member in the collet-fixture assembly or unit 10.

In order to secure the eccentric sleeves 20, 27 for rotation together, they are provided with coacting annular series of axially extending corrugations 35 which are matingly engaged when the sleeves 20, 27 are in their adjusted positions, as determined by the relative adjustment of their eccentricities in the manner indicated in Fig. 3 of the drawings. So adjusted, the sleeves subassembly is secured within the body by taking up the set screw 24.

Figure 4:
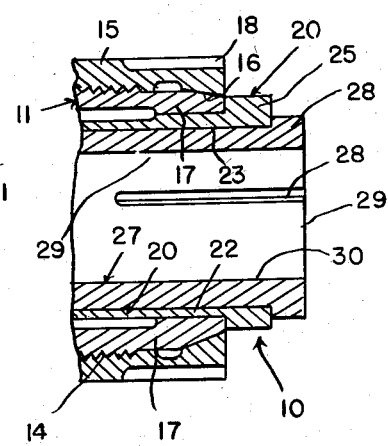
Fig. 4 is a fragmentary view in vertical axial or longitudinal section along line 4—4 of Fig. 3.

Fig. 4 of the drawings indicates one position of adjustment of the sleeves 20, 27 and it is evident that, upon individual adjustment of these sleeves relative to the body 11 and to one another, a wide range of adjustments, as to eccentricity or coaxiality, of a clamped member and an axis of rotation may be secured, these adjustments being represented in differentials of very small and precise magnitude available to the operator. When the desired setting of the clamped member is arrived at, the clamp nut 15 is taken up to rigidly secure the adjusting and clamping sleeves in tool or work holding engagement.

The collet-fixture assembly is extremely simple and inexpensive in its parts, the eccentric components 20 and 27 of which may, for example, be accurately produced on a machine tool incorporating the assembly of the invention. The mode of operation is, needless to say, extremely simple in nature and the operation is very quickly and easily performed by unskilled workmen.

What I claim as my invention is:

1. In a device for supporting tools, work and like clamped objects for rotative working, a tubular, radially flexible supporting body adapted to be rotated about its axis, a radially flexible holding member adjustably mounted on said body and acting to hold a clamped object thereon for rotation therewith, a radially flexible adjusting member disposed generally concentrically between said holding member and body, said adjusting member being adjustably rotatable relative to both said body and holding member, in coaxial relation to the former, and said adjusting and holding members having non-coaxial surfaces of circular outline in rotative sliding engagement during said adjustment, said body having a surface coaxial with the rotative axis of the body which is rotatively slidingly engaged by said adjusting member during said adjustment, whereby to vary said body and said clamped object in respect to axiality, and means to radially flex said holding object to lock said clamped member thereto, comprising means to radially flex said supporting body and said adjusting and holding members in clamping engagement with one another.

2. A collet-fixture assembly comprising a tubular external body which has a longitudinal central axis and is radially flexible at a nose end thereof and has means coaxial therewith and operable axially thereof for flexing and adjusting said end radially into and out of clamping position, an adjusting sleeve received concentrically for adjusting rotation within said body nose end about the axis of said body, said sleeve having a cylindrical bore eccentric of the axis of adjusting rotation of the sleeve, an inner clamping sleeve concentrically received for rotative adjustment within the bore of said adjusting sleeve, said clamping sleeve having a bore disposed eccentric of the axis of adjustment of said clamping sleeve and adapted to receive a clamped object, said adjusting and clamping sleeves being radially flexible adjacent said nose end of said body and being actuated by said nose end for radial clamping movement therewith upon clamping adjustment of the body to flex said nose end, and means releasably securing said sleeves for rotation together in a circumferentially adjusted position thereof, and for rotation of said sleeves with said body.

3. A collet-fixture assembly comprising an open-ended tubular external body, an outer open-ended adjusting sleeve received concentrically for adjusting rotation within the open body end, said sleeve having a cylindrical bore eccentric of the axis of rotation of the sleeve, an inner, open-ended object clamping sleeve concentrically received for rotative adjustment within the open end of said adjusting sleeve, said clamping sleeve having a clamping bore eccentric of its axis of rotative adjustment, means to radially clamp an object in said last named bore, and means for releasably securing said adjusting and clamping sleeves together and to said body in a circumferentially adjusted position thereof, comprising coacting mating formations on the sleeves engageable and disengageable upon relative axial sliding movement thereof.

4. A collet-fixture assembly comprising a tubular external body, an outer open-ended adjusting sleeve received concentrically for adjusting rotation within said body, said sleeve having a cylindrical bore eccentric of the axis of rotation of the sleeve, an inner, open-ended object clamping sleeve concentrically received for rotative adjustment within the bore of said adjusting sleeve, said clamping sleeve having a clamping bore eccentric of its axis of rotative adjustment, means to radially clamp an object in said last named bore, means for releasably securing said adjusting and clamping sleeves for rotation together in a circumferentially adjusted position thereof, comprising coacting mating formations on the sleeves engageable and disengageable upon relative axial sliding movement thereof, and means mounting said sleeves for rotation with said body.

5. A collet-fixture assembly comprising a tubular external body, an outer open-ended adjusting sleeve received concentrically for adjusting rotation within said body, said sleeve having a cylindrical bore eccentric of the axis of rotation of the sleeve, an inner, open-ended object clamping sleeve concentrically received for rotative adjustment within the bore of said adjusting sleeve, said clamping sleeve having a clamping bore eccentric of its axis of rotative adjustment, means to radially clamp an object in said last named bore, means for releasably securing said adjusting and clamping sleeves for rotation together in a circumferentially adjusted position thereof, comprising coacting mating formations on the sleeves engageable and disengageable upon relative axial sliding movement thereof, and means mounting said sleeves for rotation with said body, comprising a set screw radially threaded in said body and clampingly engaging said outer sleeve.

References Cited in the file of this patent

UNITED STATES PATENTS

| | | |
|---|---|---|
| 2,456,776 | Faust | Dec. 21, 1948 |
| 2,529,157 | Higerd | Nov. 7, 1950 |

FOREIGN PATENTS

| | | |
|---|---|---|
| 120,541 | Sweden | Dec. 30, 1947 |